United States Patent [19]

Bambara et al.

[11] 4,151,375

[45] Apr. 24, 1979

[54] SYSTEM FOR SELECTIVELY SHIFTING GROUPS OF BITS FOR TEMPORARY STORAGE IN A PROCESSOR MEMORY OF A TELEPHONE EXCHANGE

[75] Inventors: Mario Bambara; Francesco Cotroneo, both of Milan, Italy

[73] Assignee: Societa Italiana Telecomunicazioni Siemens S.p.A., Milan, Italy

[21] Appl. No.: 795,898

[22] Filed: May 11, 1977

[30] Foreign Application Priority Data

May 12, 1976 [IT] Italy ............................. 23174 A/76

[51] Int. Cl.² ............................................. H04Q 3/54
[52] U.S. Cl. ............................................. 179/18 ES
[58] Field of Search .............. 179/18 ES, 18 EB, 18 J

[56] References Cited

U.S. PATENT DOCUMENTS 3,965,458  6/1976  Borbas et al. ............... 179/18 ES X

*Primary Examiner*—Thomas W. Brown
*Attorney, Agent, or Firm*—Karl F. Ross

[57] ABSTRACT

In order to improve the utilization of a memory in an electronic processor of a telephone exchange, serving for the temporary storage of one or more 4-bit groups (referred to as quartets) in zones of 16-bit capacity, a concentration unit in the input of a logic network and an expansion unit in the output thereof are controllable to switch incoming quartets from any group position to the position of the lowest-ranking group, or pair of groups, and to switch outgoing quartets from the lowest-ranking position, or pair of positions, to other group positions. The logic network is an arithmetic unit receiving the quartets from a data memory, or from a set of working registers serving for the storage of intermediate calculation results; the outgoing quartets are fed to the data memory, to the working registers, or to a buffer register connected to a control input of the arithmetic unit.

7 Claims, 4 Drawing Figures

SYSTEM FOR SELECTIVELY SHIFTING GROUPS OF BITS FOR TEMPORARY STORAGE IN A PROCESSOR MEMORY OF A TELEPHONE EXCHANGE

FIELD OF THE INVENTION

The present invention relates to an electronic processor of the type arranged to control the telephone traffic in a telephone exchange.

BACKGROUND OF THE INVENTION

Modern telephone exchanges are generally controlled by an electronic processor which is designed to monitor connections between subscribers and to control a plurality of peripheral units required for the operation of the exchange.

In a telephone exchange, it is necessary to process data words having different length or format such as an address comprising 16 bits call-number digit comprising four bits.

Computers include a data memory having predetermined memory zones each of which is adapted to store one word.

If a 16-bit word is chosen, each zone of the data memory will then have as many cells as there are bits, i.e. 16, to be stored Conventional processors have the disadvantage that when the length of the data words to be processed is widely variable, the efficiency of the data memory is very poor since a zone 16 bits long is engaged, for example, to store a 4-bit call-number digit.

In the example described above, only one fourth of the storage capacity of a given memory zone designed to accommodate four digits is utilized.

A processor capable of handling a given amount of traffic, whose data memory is used with such a poor efficiency, must therefore include a number of memory modules which is three and sometimes four times the number of memory modules in a processor in which advantage is taken of its full potential storing capacity.

Thus, full utilization of the data memory makes it possible to reduce to one third or one fourth the number of memory modules, which results in substantial reduction in the total cost of the processor in question.

OBJECT OF THE INVENTION

The object of the present invention is therefore to provide a processor whose data memory is utilized to its full extent through the use of simple circuitry.

SUMMARY OF THE INVENTION

Our invention is particularly applicable to an electronic processor which comprises a number of conventional components including temporary storage means, such as a data memory and associated working registers, having zones each capable of storing n multibit groups of k bits each in respective sections thereof, with $k=n=4$ in the specific embodiment described hereinafter. These multibit groups, to be referred to as "quartets", occupy positions of different ranks, with the first or lowest-ranking group encompassing the k least significant bits whereas the $n^{th}$ group encompasses the k most significant bits. A logic network performs arithmetic operations on multibit groups incoming from and outgoing to the storage means, in response to commands from a control unit responsive to instructions read out from a program memory.

Pursuant to our present improvement, a unit inserted between an output of the storage means and an input of the logic network serves for selectively shifting incoming multibit groups from higher-ranking positions to the lowest-ranking position, referred to hereinafter as No. 0. Another unit, inserted between an output of the logic network and an input of the storage means, serves for selectively shifting outgoing multibit groups from this lowest-ranking position to higher-ranking positions. The transfer to the No. 0 position may be regarded as a concentrating operation whereas the reverse operation may be considered as an expanding operation. We shall therefore refer to these two switching units as a concentration unit and an expansion unit, respectively. The two switching units operate in response to commands from the control unit transmitted to a signal generator which also receives code words from the program memory as part of the read-out instructions. Aside from controlling the switching operations of the concentration and expansion units, the signal generator also enables corresponding sections of the storage means to receive outgoing multibit groups in the positions assigned to them by the two switching units.

According to a more particular feature of our invention, each of the two switching units is operable to shift two multibit groups simultaneously, namely to the lowest-ranking position (No. 0) and the second-lowest ranking position (No. 1) in the case of incoming groups and from these No. 0 and 1 positions in the case of outgoing groups. For this purpose, as more fully described hereinafter, the concentration unit and the expansion unit are respectively provided with a plurality of first and second multiplexers operable individually and jointly under the control of the signal generator.

BRIEF DESCRIPTION OF THE DRAWING

The above and other features of our invention will now be described in detail with reference to the accompanying drawing in which.

SPECIFIC DESCRIPTION

Figure 1:
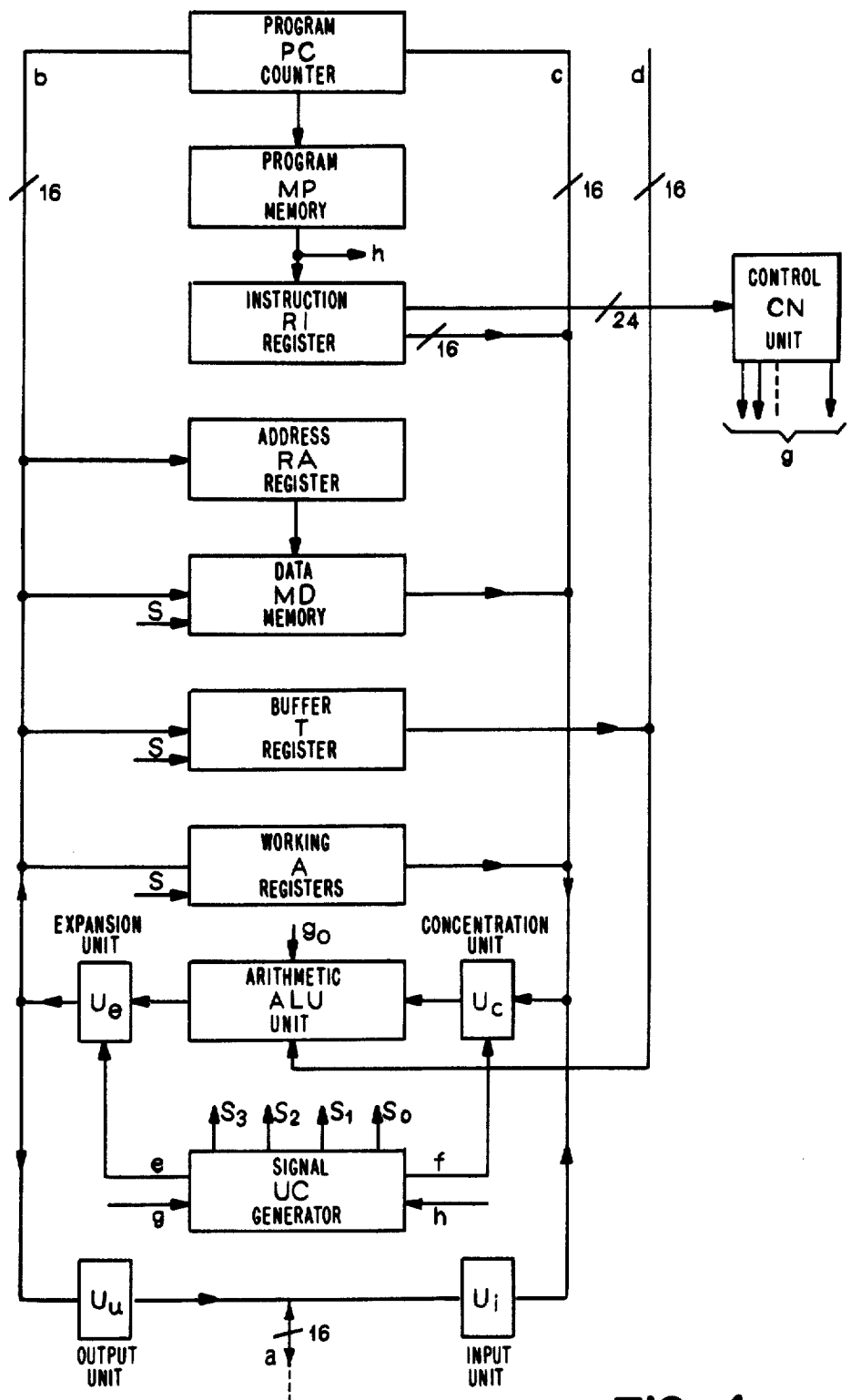
FIG. 1 is a block diagram of a processor according to the invention.

The processor according to our invention, illustrated in FIG. 1, is provided with several 16-lead multiples or buses, namely:

- a bidirectional bus a to which peripheral units (not shown) controlled by the processor are connected and through which flow the data exchanged between the processor and the peripheral units;
- an output bus b supplied with data from a logic network ALU serving as an arithmetic unit;
- a data bus c feeding the logic network ALU; and
- a register bus d arranged to convey to logic network ALU data desinged to be utilized for carrying out arithmetical and logic operations in conjunction with the data available on bus c.

In parallel with the output bus b and the data bus c there are connected the following units:

- a program counter PC whose contents define the address of the instruction to be carried out in a given operating phase;

a program memory MP in which the instructions scanned by the program counter are stored;

an instruction register RI to which the instructions available at the output of the program memory are supplied;

an address register RA which is connected to the output bus b and is adapted to store address bits by means of which it is possible to identify the data to be processed;

a data memory MD which is addressed by the contents of the address register RA and is adapted to store the data to be processed;

the aforementioned arithmetic unit ALU adapted to process the data on buses c and d in accordance with the contents of the operative code provided for each instruction and received on an input $g_o$ from a control unit cn;

a plurality of working registers generally designated A in FIG. 1; and a buffer register T for the temporary storage of data to be processed and to be forwarded to register bus d.

A concentration unit $U_c$ is connected to the input of the logic network ALU while an expansion unit $U_e$ is connected to the output thereof.

The bidirectional bus a is connected to the data bus c by way of an input unit $U_i$, and to the output bus b by way of an output unit $U_u$.

Instructions present in the register RI are sent to control unit CN which decodes the instructions and controls the operations specified by them.

The operation of the circuit arrangement described above can be illustrated as follows by considering the execution of a given memory-reference instruction whose structure is represented in the following table:

TABLE A

| 5 operative code | 2 mode of addressing | 3 quartet code | 14 operand address |
|---|---|---|---|

In this type of instruction, a 5-bit first segment is the operative code which indicates the type of operation to be carried out on the data to be processed.

A 2-bit second segment indicates the mode (e.g. direct or indirect of) addressing in the instruction in question.

This segment indicates, for example, that the address of the data to be processed is that contained in the instruction itself (direct addressing), or that the instruction contains a binary configuration designed to be used to obtain the address of the data to be processed (indexed indirect addressing).

A 3-bit segment constitutes a quartet code indicating which and how many bits among a predetermined number of bits are to be processed in the instruction being carried out. In other words, assuming that in the data memory MD the data to be processed are stored as 16-bit packets, the quartet code indicates whether a specific group of 4 bits, a specific group of 8 bits, a group of 12 bits or the contents of the entire memory zone are to be processed.

A 14-bit fourth segment concerns the operand address specifying the location in the data memory MD (in the case of direct addressing) in which the data to be processed are stored.

In a given instance, the contents of the program counter PC have a binary configuration which indicates a zone of the data memory MD containing for example a memory-reference instruction.

Such an instruction then becomes available at the output of the program memory MP and is sent to the instruction register RI and then to the control unit CN.

The unit CN examines the mode of addressing and, in the case of direct addressing, enables the 14 bits of the operand address to be transferred to the address register RA.

Such an address indicates a zone of the data memory MD in which the 16 bits of each memory zone are stored.

The 16 bits thus identified are forwarded on the data bus c to the input of the concentration unit $U_c$.

The control unit CN commands the transfer of the bits of the quartet code to a signal generator UC which is designed to monitor this instruction segment and to specify which data among those identified by the operand address are to be processed in the instruction being carried out.

Allocation of a given datum, e.g. a call-number digit, to a predetermined quartet of the data memory MD or of the set of working registers A is performed, via one or more instructions, by the concentration unit $U_c$ and-/or the expansion unit $U_e$ to which the generator UC transmits control pulses.

For a better understanding of the meaning of the quartet code let us consider each memory zone of 16-bit capacity sub-divided into four 4-bit quartets Nos. 0 to 3 as indicated in table:

TABLE B

| 3 | 2 | 1 | 0 |
|---|---|---|---|

Within any 16-bit packet, the quartet No. 0 encompasses the least significant bits, whereas the quartet No. 3 includes the most-significant bits.

In order to fully utilize the potential storing capacity of the data memory it is necessary for instance to store four call-number digits (each represented by 4 bits) in a single memory zone.

However, storing 4 such digits in a single memory zone is impossible unless the quartet code is used, because by the use of only the operand address the four call-number digits would each be written in the least significant quartet of the data memory and writing of a digit would result in the cancellation of the digit previously inscribed.

Let us assume that a first call-number digit had been stored in the quartet No. 0 of a given memory zone and that one wishes to store a second digit in the quarter No. 1 of the same memory zone.

Let us further assume that the digit to be entered in quartet No. 1 is stored in quartet No. 0 of register assembly A, and that an instruction directs the transfer of the data present in register quartet No. 0 to quartet No. 1 in the memory zone identified by the instruction section carrying the operand address.

Such a transfer is effected, in this case, by the expansion unit $U_e$ which is controlled by the signal generator UC.

This example, the concentration unit $U_c$ does not intervene and merely passes the arriving data whereas unit ALU carries out a simple transfer operation.

The contents of the register assembly A are thus transmitted unchanged to the input of the expansion unit $U_c$.

The expansion unit emits 16 output bits onto the leads of the bus b; contents of the two most significant quartets Nos. 2 and 3 received from unit ALU remain unchanged, as do the contents of quarter No. 0, while the contents of quarter No. 1 are modified because it the call-number digit stored in quarter No. 0 of assembly A.

The signal operator UC produces writing pulses $S_0$, $S_1$, $S_2$ and $S_3$ (collectively designated S at the inputs of components MD, T and A) which enable the respective sections of the registers A, T and of the zones of the data memory MD to receive the bits intended for them.

In the case described above, only the output $S_1$ will be activated to cause the writing of the call-number digit in the quarter No. 1 of the zone of the data memory identified by the operand address of the memory-reference instruction considered.

The concentration unit $U_c$, controlled by signals f from generator UC, intervenes in the case where the data to be entered are stored in a quartet other than the quartet No. 0 containing the least significant bits. Let us assume that a call-number digit stored in quarter No. 3 of a second memory zone is to be transferred to quartet No. 2 of a first memory zone. Upon the arrival of a first instruction, the contents of the second memory zone are read out and delivered to the concentration unit $U_c$ by way of the data bus c.

Signal generator UC then feeds control pulses e to the concentration unit $U_c$ which thereupon emits 16 bits with the content of quartets Nos. 1 and 2 unchanged since they are unaffected by this operation. The contents of quartet No. 0 are, however, modified in accordance with the call-number digit which is stored in quartet No. 3.

The output $S_0$ of generator UC is, in this case, energized and commands the writing of this call-number digit in the quartet No. 0 of register assembly A.

Upon the arrival of a second instruction, the contents of the register assembly A are read out to the input of an expansion unit $U_e$ which is controlled by impulses e and allocates the call-number digit to quarter No. 2 as described with reference to the foregoing example concerning the transfer of data stored in the least-significant quartet to any other quartet.

Figure 2:
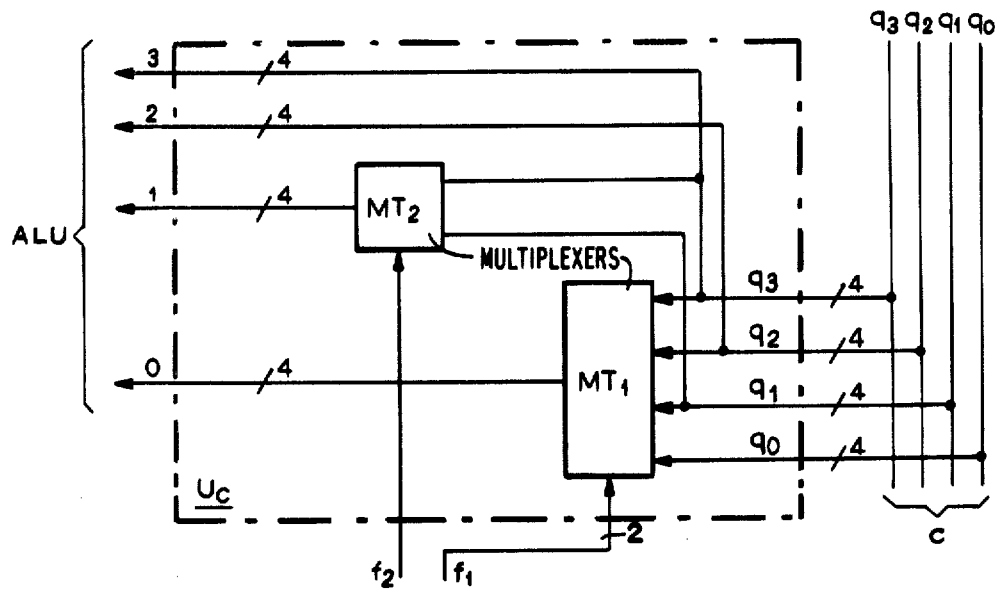
FIG. 2 illustrates details of a concentration unit included in the processor of FIG. 1.

FIG. 2 shows the concentration unit $U_c$ connected to the 16 wires of data bus c whose number corresponds to the storage capacity of each memory zone. For simplicity's sake, a single conductor represents a group of four wires $q_0$–$q_3$, with wire q designed to receive the least-significant bits in a given memory zone, wires $q_1$ designed to receive the bits of the second-lowest quartet, and so forth.

Transfer of the contents of any quartet to the position of quarter No. 0 is obtained by controlling the concentration unit $U_c$ so as to obtain, on its output, the binary configuration previously stored in a selected quartet of a given memory zone.

To this end, the concentration unit $U_c$ comprises a multiplexer $MT_1$ whose inputs are connected to the wires $q_0$, $q_1$, $q_2$ and $q_3$ of the data bus c.

The multiplexer $MT_1$ is controlled by a signal $f_1$, constituting one of the signals f (FIG. 1) available at the output of the generator UC, which switches the corresponding input of this multiplexer —connected to one of the 4-wire groups $q_0$–$q_3$ of bus c—to the No. 0 input of logic network ALU.

Generator UC also controls a multiplexer $MT_2$ designed to be utilized for the concentration of two incoming quartets forming an octet, i.e. their transfer to positions Nos. 0 and 1 in unit ALU.

Let us assume that, in a certain phase, processing of only 8 of the 16 bits stored in a given memory zone is required, namely the bits present in quartets Nos. 2 and 3.

In this case, both the multiplexer $MT_1$ and the multiplexer $MT_2$ are utilized. Multiplexer $MT_2$ is controlled by a signal $f_2$.

The data on the wires $q_2$ of bus c are transferred to the output of the multiplexer $MT_1$, whereas the data on the wires $q_3$ of that bus are transferred to the output of the multiplexer $MT_2$ feeding to No. 1 input of unit ALU.

When no concentration is required, the multiplexer $MT_1$ transfers to its output the data present on the wires $q_0$, of bus c the multiplexer $MT_2$ transfers to its output the data present on the wires $q_1$ of that bus, and the data present on the wires $q_2$ and $q_3$ of bus c are directly transferred to the inputs Nos. 2 and 3 of unit ALU.

Figure 3:
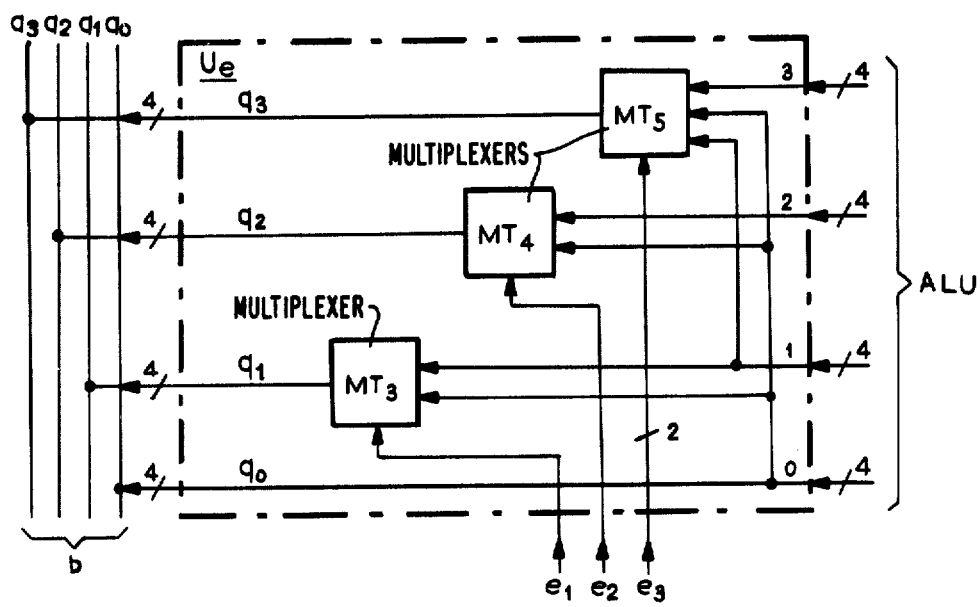
FIG. 3 illustrates details of an expansion unit included in the processor of FIG. 1.

The expansion unit $U_e$ of FIG. 3 supplies the output bus b whose 16 wires are also divided into four groups $q_0$–$q_3$ having the same ranks as in bus b.

The contents of four quartets available at the output of unit ALU are sent to respective inputs Nos. 0 to 3 of expansion unit $U_e$.

The input No. 0 of unit $U_e$ is directly connected to wire group $q_0$ of bus b whereas its input No. 1 is connected to the wire group $q_1$ by way of a multiplexer $MT_3$ which is also connected to the input No. 0.

The input No. 2 is connected to wire group $q_2$ by way of another multiplexer $MT_4$ which is also connected to the input No. 0, whereas the input No. 3 is connected to wire group $q_3$ by means of a further multiplexer $MT_5$ which is also connected to input Nos. 0 and 1, The multiplexers $MT_3$, $MT_4$ and $MT_5$ are controlled by pulses $e_1$, $e_2$, $e_3$ forming part of signals e (FIG. 1) available at the output of generator UC. The connection carrying pulses $e_3$ consists of two wires, as indicated schematically.

Selective transfer of the contents of the quartet No. 0 of unit ALU to a higher-ranking quartet of a component served by bus b is obtained by means of the multiplexers $MT_3$, $MT_4$ and $MT_5$ to whose inputs the contents of the least-significant quartet available at the input No. 0 of the expansion unit are applied. By enabling one of these multiplexers, the contents of quarter No. 0 are transferred to the quartet fed by the multiplexer so enabled.

If the contents of two quartets must be transferred because an octet is going to be processed, two of the multiplexers $MT_3$–$MT_5$ are used.

Let us assume that the contents of quartets Nos. 0 and 1 are required to be transferred to the positions of quartets Nos. 2 and 3; in that case the two multiplexer $MT_4$ and $MT_5$ are utilized.

The multiplexer $MT_4$ will transfer to its output the contents of quartet No. 0, wile the multiplexer $MT_5$ will transfer to its output the contents of quartet No. 1 available at the input No. 1 of the expansion unit $U_e$.

Figure 4:
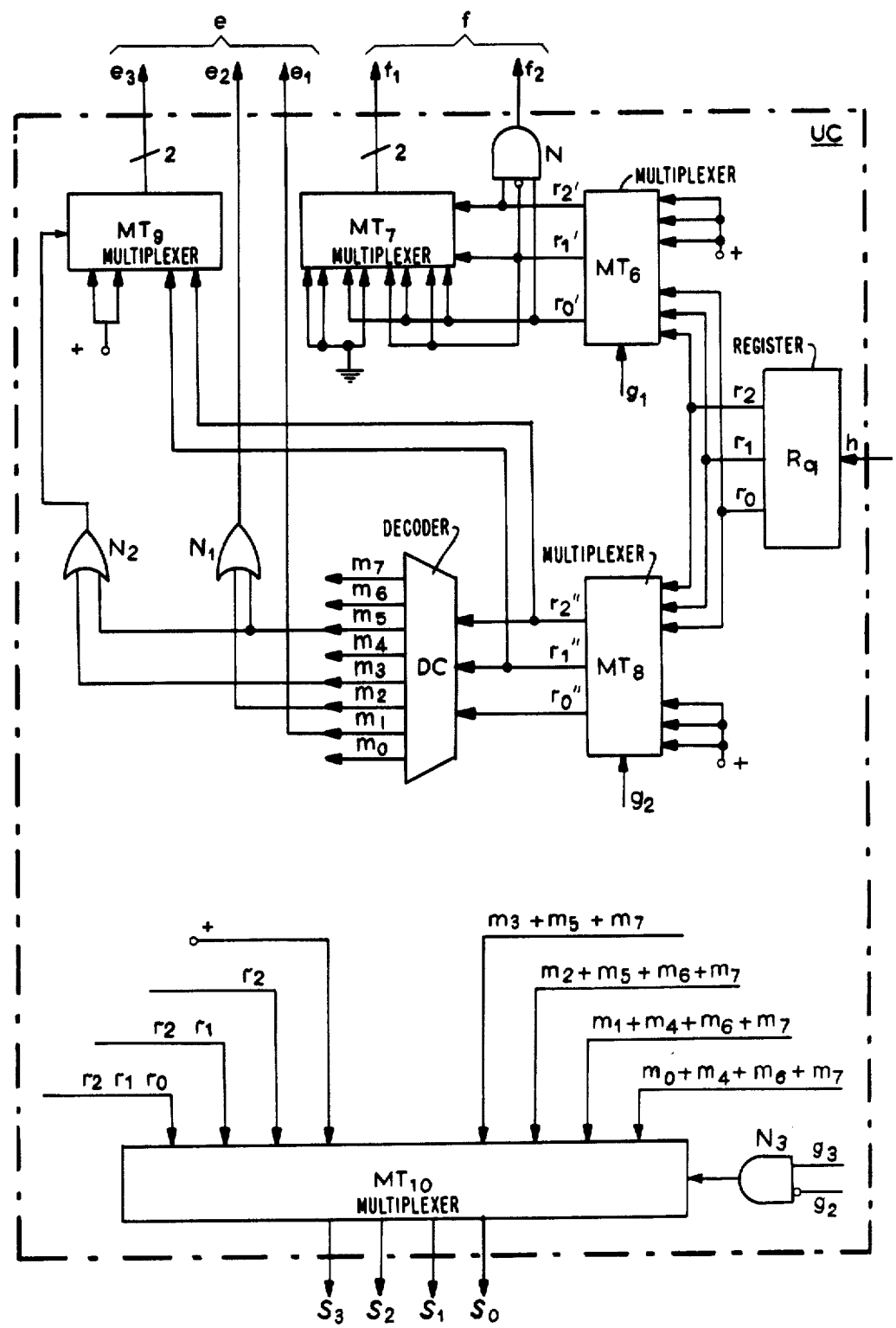
FIG. 4 illustrates details of a signal generator forming part the processor.

The three bits of the quartet code are applied to the input h of the control unit UC of FIG. 4 and stored in a register $R_q$. This register is connected to the first input of a multiplexer $MT_6$ whose second input receives as many bits, of logic value 1, symbolized by $+$.

The multiplexer $MT_6$ is controlled by a signal $g_1$ from the control unit CN which one of the two binary configurations available at the inputs of that multiplexer.

The two most significant outputs $r_1$, $r_2$, of the multiplexer $MT_6$ are connected to the control input of a multiplexer $MT_7$ so as to select one of four predetermined binary configurations on as many inputs.

The binary configurations selected by the multiplexer $MT_7$ constitutes the signal $f_1$ which travels over a two-wire connection, as schematically indicated, to control the multiplexer $MT_1$ of FIG. 2 designed to transfer the contents of a given incoming quartet to the position of quartet No. 0 of unit ALU. The multiplexer $MT_2$ is controlled by a signal $f_2$ available at the output of an AND gate N to which the bits $r_0'$, $r_1'$, $r_2'$ available at the output of the multiplexer $MT_6$ are supplied, with inversion of bit $r_1'$ at an input of this gate.

The three bits of the quartet code available at the output of the register $R_q$ are also applied to a first input of a multiplexer $MT_8$ whose second input receives as many bits +5 of logic value 1.

The multiplexer $MT_8$ is controlled by a signal $g_2$ from the control unit CN.

A decoding unit DC, which is adapted to decode the eight possible binary configurations applied to its inputs, is connected to the output of the multiplexer $MT_8$ carrying bits $r_0''$, $r_1''$, $r_2''$.

Outputs $m_0$, $m_1$, ..., $m_7$ of decoder DC are used to control the expansion unit $U_e$.

The multiplexer $MT_3$ of unit $U_e$ (FIG. 3) is controlled by the signal $e_1$ available at the output No. 0 of the decoder DC whereas the multiplexer $MT_4$ is controlled by the signal $e_2$ available at the output of an OR gate $N_1$ to which signals $m_2$ and $m_5$ are applied.

The multiplexer $MT_5$ is controlled by two bits available at the output of a multiplexer $MT_9$ whose control input receies a signal from the output of an OR gate $N_2$ to which the input signals $m_3$ and $m_5$ are applied.

The multiplexer $MT_9$ receives on a first input thereof the two most significant bits $r_1''$, $r_2''$ available at the output of the multiplexer $MT_8$, and two bits +5 of logic value 1 on a second input.

In those cases in which no concentration and/or no expansion is required, the signals $g_1$ and/or $g_2$ have a logic value such that the signals e and/or f render the concentration unit $U_c$ and/or the expansion unit $U_e$ transparent, i.e. allowing the incoming bit groups or quartets to pass through without shift in position.

When concentration and/or expansion is required, intervention of one or more multiplexers of the corresponding switch unit $U_c$ and/or $U_e$ depends on the logic value of the bits in the quartet code read out from register $R_q$.

Similarly, activation of pulses S designed to be utilized to command the writing of data in the quartets of the data memory MD and the working register A depends on the bits of the quartet code and on the logic value of the pulses g generated by the control unit CN.

The pulses S, individually designated $S_1$ -$S_4$, are obtained from a multiplexer $MT_{10}$ which is controlled, by way of an AND gate $N_3$, by signals $g_2$ and $g_3$ both forming part of the output signals g generated by the control unit CN. Gate $N_3$ has an inverting input receiving the signal $g_2$.

The multiplexer $MT_{10}$ receives, on four first inputs, a bit +5 as well as pulses which consitute bits $r_0$, $r_1$, $r_2$ of the quartet code and combinations thereof and, on four second inputs, pulses which are combinations of output signals $m_1$—$m_7$ of the decoding unit DC.

The signal available at the output of the OR gate $N_3$ commands the transfer of the binary configuration from the four first inputs of multiplexer $MT_{10}$, or of the binary configuration from its four second inputs, to the outputs $S_0$, $S_1$, $S_2$, $S_3$ thereof.

The decoder outputs $m_0$–$m_7$ are individually energized, in the conventional manner, according to which one of the eight possible bit combinations $r_0$, $r_1$, $r_2$ appears in the code word h fed to register $R_q$ from program memory MP (FIG. 1). The bit combination 1-1-1 corresponds, of course, to the configuration present at the upper set of inputs of multiplexer $MT_6$ and at the lower set of inputs of multiplexer $MT_8$. Bits $r_0'$-$r_2'$ in the outputs of multiplexer $MT_6$ and bits $r_0''$-$r_2''$ in the outputs of multiplexer $MT_8$ have such an all-1 configuration when no transfer is required, i.e. when units $U_c$ and $U_e$ are transparent as noted above. This transparent condition requires that multiplexers $MT_1$ and $MT_2$ (FIG. 2) as well as multiplexers $MT_3$, $MT_4$ and $MT_5$ (FIG. 3) be in their normal state. The quartets present on the several four-wire multiples $q_0$-$q_3$ of bus c then travel in their original positions to the inputs of unit ALU and from the outputs of that unit to the corresponding multiples of bus b.

In order that these outgoing quartets may be properly written into respective sections of the storage means represented by memory MD, buffer register T or working register A, the enabling signals $S_0$ -$S_3$ issuing from generator UC must all be present. This will be apparent from FIG. 4 where multiplexer $MT_{10}$ energizes all four of its outputs in its left-hand position with $r_0 = r_1 = r_2 = 1$ and in its right-hand position with $m_7 = 1$. The latter position of multiplexer $MT_{10}$, connecting it to the outputs of decoder DC, evidently has utility only when multiplexer $MT_8$ stands on its upper set of inputs connected to register $R_q$. Since AND gate $N_3$ has an output $g_2g_3$ only in the presence of command $g_3$ and in the absence of command $g_2$, we may assume by way of example that multiplexer $MT_8$ stands on its upper inputs with $g_2 = 1$ whereas multiplexer $MT_{10}$ stands on its left-hand inputs only with $g_2=0$, $g_3$ L32 1.

Let us first consider the outgoing quartets issuing from expansion unit $U_e$ in the presence of different code words h and with $g_2 = g_3 = 1$ as assumed above. With h = 0-0-0, decoder DC energizes its output $m_0$ which has no effect upon the switching signals e but generates the enabling signal $S_0$ in the output of multiplexer $MT_{10}$, with the result that only the lowest-ranking quartet coming from the No. 0 output of unit ALU can be entered by way of wire multiple $q_0$ of bus b in a corresponding section of storage means MD, T or A. With h=0-0-1, decoder output $m_1$ is active to generate the switching signal $e_1$ and the enabling signal $S_1$; signal $e_1$ shifts the multiplexer $MT_3$ to its alternate position whereby a quartet from the No. 0 output of unit ALU is transferred to wire multiple $q_1$ of bus b for entry in a storage section assigned to the second-lowest-ranking quartet. With h=0-1-0 and energization of decoder output $m_2$, signals $e_2$ and $S_2$ come into existence; the resulting shifting of multiplexer $MT_4$ to its alternate position transfers the quartet from the No. 0 output of unit ALU to wire multiple $q_2$ of bus b for writing in a storage section of second-highest rank. In all these instances, the absence of an output signal from OR gate $N_2$ maintains the multiplexer $MT_9$ in its left-hand position so that high voltage (+) on its inputs gives rise to a switching signal $e_3=1$-1 whereby multiplexer $MT_5$ stands on its uppermost input, connecting the No. 3 output of unit ALU to multiple $q_3$ of bus b.

With h=0-1-1, the active decoder output $m_3$ causes a shifting of multiplexer $MT_9$ to its right-hand position in which the bits $r_1''=1$ and $r_2''=0$ are transmitted to its output to generate the switching signal $e_3=1-0$ corresponding to the middle position of multiplexer $MT_5$. Thus, the quartet present on the No. 0 output of unit ALU is now transferred to the wire multiple $q_3$ of bus b leading to a storage section enabled by output signal $S_3$ of multiplexer $MT_{10}$.

When the code word h has the value 1-0-0, activating decoder output $m_4$, two enabling signals $S_0$ and $S_1$ are emitted by multiplexer $MT_{10}$. The situation is otherwise the same as with $h=0-0-0$ so that the multiplexers of expansion unit $U_e$ remain unswitched, allowing the octet present on the two lowest-ranking outputs (Nos. 0 and 1) of unit ALU to reach the associated multiples $q_0$ and $q_1$ of bus b for entry into storage sections of corresponding rank.

With h=1-0-1, decoder DC energizes its output $m_5$ whereby multiplexer $MT_{10}$ emits enabling signals $S_2$ and $S_3$ simultaneously. By way of OR gate $N_1$, switching signal $e_2$ is generated to shift the multiplexer $MT_4$; at the same time, via OR gate $N_2$, multiplexer $MT_9$ is shifted to its right-hand inputs whereby bits $r_1''=0$ and $r_2''=1$ give rise to switching signal $e_3=0-1$ to set the multiplexer $MT_5$ on its bottom input. The octet present on the No. 0 and No. 1 outputs of unit ALU are now transferred by multiplexers $MT_4$ and $MT_5$ to multiples $q_2$ and $q_3$ for entry into the two highest-ranking sections of a zone of memory MD or of one of the registers T, A.

The code word $h=1-1-0$ activates the decoder output $m_6$ with consequent generation of enabling signals $S_0$, $S_1$ and $S_2$ to permit the transfer of the three quartets on the Nos. 0, 1 and 2 outputs of unit ALU to correspondingly ranking storage sections via multiples $q_0$, $q_1$ and $q_2$ of bus b. Finally, code word $h=1-1-1$ energizes the decoder output $m_7$ to establish the aforedescribed transparent condition of unit $U_e$, with the quartets from all the outputs of unit ALU passing straight through to corresponding multiples of bus b.

We shall now consider the handling of incoming quartets by concentration unit $U_c$ whose operation, with $g_1=1$, is complementary to that of expansion unit $U_e$ as described above.

In order to satisfy the aforestated transparency requirement for concentration unit $U_c$, multiplexers $MT_1$ and $MT_2$ must stand on their lower inputs respectively connected to wires $q_0$ and $q_1$ of bus c, with $f_1$ having the binary value of 0-0 and $f_2$ equal to 0. From FIG. 4 it will be seen that $f_1=0-0$ occurs not only when multiplexer $MT_7$ stands on its grounded pair of extreme left-hand inputs, with $r_1'=r_2'=1$, but also when it stands on its extreme right-hand inputs with $r_0'=r_1'=r_2'=0$, i.e. when h=0-0-0. The latter situation, accordingly, allows a transmission of the lowest-ranking quartet from wire multiple $q_0$ of bus c to the corresponding No. 0 input of unit ALU. With $h=0-0-1$, multiplexer $MT_7$ is still in its extreme right-hand position but its inputs now carry the bit combination $r_0'=1$ and $r_1'=0$ which results in a switching signal $f_1=0-1$ whereby multiplexer $MT_1$ is shifted to its second-lowest position for a transfer of the quartet of second-lowest rank, from multiple $q_1$ of bus c, to the No. 0 input of unit ALU. With $h=0-1-0$, similarly, multiplexer $MT_7$ stands on its second-from-right pair of inputs to generate the bit combination $f_1=1-0$ with consequent shifting of multiplexer $MT_1$ to its second-highest position, allowing a transfer of the quartet present on multiple $q_2$ of bus c to the No. 0 input of unit $MT_1$. With $h=0-1-1$, multiplexer $MT_7$ remains in the position last described but produces a switching signal $f_1=1-1$ to shift the multiplexer $MT_1$ to its highest position, for transfer of a quartet from multiple $q_3$ of bus c to the No. 0 input of unit ALU.

Code word $h=1-0-0$ shifts the multiplexer $MT_7$ to its second-from-left pair of inputs whereby switching signal $f_1$ assumes once more the configuration 0-0. Since we still have $f_2=0$, multiplexers $M_1$ and $M_2$ are again both in their bottom positions to let an octet from multiples $q_0$ and $q_1$ of bus c pass to the Nos. 0 and 1 inputs of unit ALU. With $h=1-0-1$, multiplexer $MT_7$ stays in its last-mentioned position but produces an output $f_1=1-0$ so that multiplexer $MT_6$ shifts to its second-highest position; AND gate N conducts at the same time to produce $f_2=1$, with consequent shifting of multiplexer $MT_2$ to its alternate position. The two multiplexers of unit $U_c$, therefore, now transfer an octet on multiples $q_2$ and $q_3$ of bus c to inputs Nos. 0 and 1 of unit ALU.

The appearance of a code word $h=1-1-0$ brings the multiplexer $MT_7$ back to its extreme left-hand position and once again gives rise to an output signal $f_1=0-0$. With AND gate N no longer conductive, multiplexer $MT_2$ has also returned to its normal position; thus, three quartets present on multiples $q_0$, $q_1$, $q_2$ of bus c can simultaneously pass through unit $U_c$ to the three lowest-ranking inputs (Nos. 0, 1 and 2) of unit ALU. The presence of a code word $h=1-1-1$, finally, renders the concentration unit fully transparent as already pointed out.

With multiplexer $MT_{10}$ standing on its left-hand inputs, the enabling signal $S_0$ is generated at all times as indicated in FIG. 4. Signal $S_1$ comes into existence with code words h having values of 1-0-0 or higher ($r_2=1$), whereas signal $S_2$ begins to appear with $h=1-1-0$ ($r_2r_1=1$). The transparency condition ($S_0=S_1=S_2=S_3=1$) occurs only with h=1-1-1, i.e. $r_2r_1r_0=1$. The selective generation of these enabling signals is consistent with the passage of one, two, three or four quartets from bus c to unit ALU as described above.

We claim:

1. In an electronic processor provided with temporary storage means having zones each capable of storing n multibit groups of k bits each in respective sections thereof, said groups occupying relative positions of different ranks and including a lowest-ranking first group and a highest-ranking $n^{th}$ group, and with a logic network performing arithmetic operations on incoming multibit groups received from said storage means and sending the results of said operations as outgoing multibit groups to said storage means, the processor further including a program memory and control means responsive to instructions read out from said program memory for controlling the operations of said logic network, the combination therewith of:

a concentration unit inserted between an output of said storage means and an input of said logic network for selectively shifting incoming multibit groups from a higher-ranking position to a lowest-ranking position;

an expansion unit inserted between an output of said logic network and an input of said storage means for selectively shifting outgoing multibit groups from the lowest-ranking position to a higher-ranking position; and signal-generating means responsive to commands from said control means and to code words from said program memory, forming part of read-out instructions, for actuating said concentration and expansion units and for enabling corresponding sections of said storage means to receive outgoing multibit groups in the positions assigned to them.

2. The combination defined in claim 1 wherein the number of said relative positions is greater than two, said concentration unit comprising a first plurality of multiplexers selectively operable to shift two incoming multibit groups to said lowest-ranking position and to a second-lowest-ranking position, respectively, said expansion unit comprising a second plurality of multiplexers selectively operable to shift two outgoing multibit groups from said lowest-ranking and second-lowest-ranking positions to other positions.

3. The combination defined in claim 2 wherein said signal-generating means comprises a register for bits of the code words from said program memory, first switchover means with input connections to said register for emitting switching signals for said first plurality of multiplexers in the presence of a first command from said control means, second switchover means with input connections to said register for emitting switching signals for said second plurality of multiplexers in the presence of a second command from said control means, and third switchover means with input connections to said register for emitting enabling signals for said storage means in the presence of a third command from said control means.

4. The combination defined in claim 3 wherein said second switchover means includes a multiplexer and a decoder in cascade therewith, the input connections of said third switchover means comprising a first set of leads extending from said register and a second set of leads extending from said decoder.

5. The combination defined in claim 4 wherein said first switchover means comprises a pair of cascaded multiplexers and a logic gate with inputs connected to respective outputs of the first cascaded multiplexer, said first plurality of multiplexers having switching inputs connected to outputs of the second cascaded multiplexer and of said logic gate.

6. The combination defined in claim 4 wherein said third multiplexer has a control input energizable via a logic gate in the presence of said third command and a negation of said second command.

7. The combination defined in claim 1 wherein $n = k = 4$.

* * * * *